July 6, 1954 H. R. RICARDO 2,683,029
LIQUID STORAGE AND CARBURETING APPARATUS
Filed Dec. 7, 1951
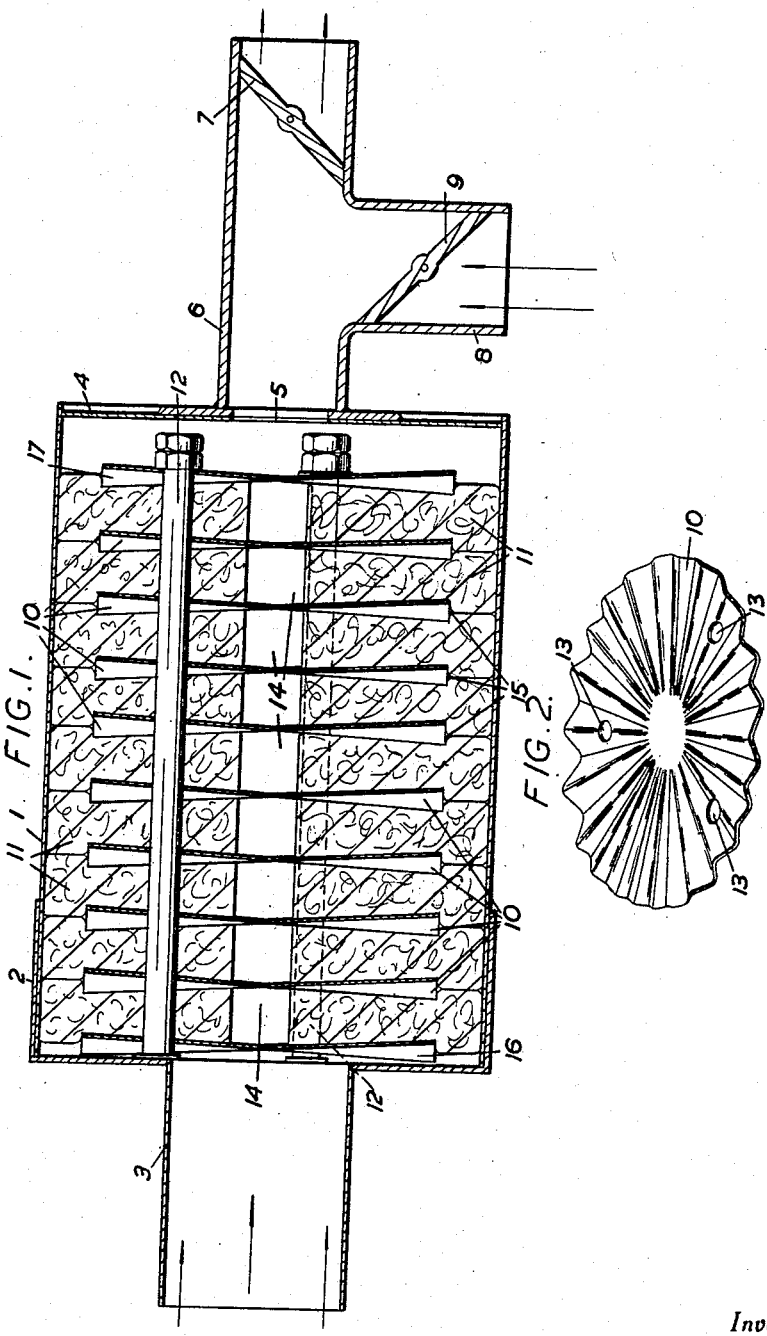
Inventor
Harry R. Ricardo
By Watson, Cole,
Grindle & Watson
Attorney Patented July 6, 1954

2,683,029

UNITED STATES PATENT OFFICE 2,683,029

LIQUID STORAGE AND CARBURETING APPARATUS

Harry Ralph Ricardo, London, England, assignor to Ricardo & Co. Engineers (1927) Limited, London, England, a British company Application December 7, 1951, Serial No. 260,535

Claims priority, application Great Britain January 29, 1951

4 Claims. (Cl. 261—95)

This invention relates to liquid storage and carburetting apparatus and has for an object to provide a form of carburetting apparatus which will function in substantially any attitude.

The invention is particularly applicable to carburetting apparatus for producing the fuel/air mixture of vaporised charge internal combustion engines, especially comparatively small engines, but it will be understood that it may also be applied to carburetting apparatus for other purposes where it is desired to mix air or other gas with the vapour from a liquid.

Thus one particular application of the invention is to the fuel supply and carburetting apparatus of an internal combustion engine where it is desired that the carburetting apparatus shall function satisfactorily irrespective of its attitude.

According to the present invention a combined liquid storage and carburetting apparatus comprises a body of liquid-absorbent material constituting a liquid reservoir which will retain liquid by capillary attraction, and at least one substantially impervious wall a face of which of substantial area lies in contact with a corresponding area of the surface of the liquid-absorbent material, the said face of the substantially impervious wall being formed to provide a group of passages or channels each of small cross-sectional area between it and the surface of the absorbent material such passages extending in parallel between a gas inlet passage or chamber and a carburetted mixture outlet passage or chamber so that gas flowing from the inlet chamber to the outlet chamber flows through the group of passages, during which flow the gas becomes mixed with vapour from the liquid in the absorbent material. Preferably the absorbent material is of a hard felt-like character.

Preferably the apparatus comprises a series of spaced substantially impervious walls formed either separately or as a single element with liquid-absorbent material interposed between them, the absorbent material being formed or arranged to provide, between corresponding parts of the adjacent faces of each pair of adjacent walls between which the absorbent material lies, a communicating passage or space unobstructed by the absorbent material, so as to permit free flow of gas between such parts of said faces, while the walls are formed to provide between each face of each wall and the absorbent material lying in contact therewith a group of passages of small cross-sectional area extending in parallel between the appropriate one of the communicating passages referred to and an edge portion of the wall arranged so that gas can pass from the group of passages extending along one face of the wall, around the edge and into the group of passages extending along the other face of the wall, and inlet and outlet passages communicating respectively with the spaces in the absorbent material lying respectively between the two pairs of walls most remote from one another, so that gas flowing through the assembly between the inlet and outlet passages will travel in series through the groups of passages formed between the walls and the absorbent material with the communicating passages serving to permit the required flow between the adjacent faces of adjacent walls. The inlet and outlet passages may communicate with the communicating passages in the absorbent material respectively between the pairs of walls most remote from one another, either directly through holes in the two walls most remote from one another or through the groups of passages between the inner faces of the walls most remote from one another and the adjacent absorbent material.

Preferably, however, the apparatus comprises a series of spaced substantially impervious plates, pieces of liquid-absorbent material interposed between them and forming a body of such material constituting the liquid reservoir with each piece of the absorbent material lying between the adjacent faces of two plates and provided with an aperture forming a communicating passage between such faces while the plates are formed with channels forming between each face and the adjacent face of the absorbent material a group of passages extending in parallel between the communicating passage aperture referred to and the edge of the plate, from which edge the corresponding group of passages on the other face of the plate lead in parallel to the communicating passage aperture in the absorbent material in contact with the other face, the edge of each plate to which the channels in its two faces lead lying within the body of absorbent material. In such an arrangement the gas inlet passage or chamber conveniently communicates directly or through the channels in the inner face of one end plate of the series with the communicating passage aperture in the piece of absorbent material between that end plate and the next plate, while a carburretted mixture outlet passage or chamber similarly communicates with the communicating passage aperture in the piece of absorbent material between the two end plates at the other end of the series.

In a preferred arrangement of this type the plates are arranged in spaced substantially parallel relationship and the channels extend from points adjacent to the centre of the plates to their peripheries while the pieces of liquid-absorbent material lying between the plates are formed with central apertures, the arrangement being such as to permit flow of gas around the peripheral edges of the plates from the outer ends of the channels in one face of each plate into the outer ends of the channels in the other face of the plate. Such an arrangement may be achieved with suitable liquid-absorbent material by arranging for peripheral portions of the material to extend beyond the peripheral edges of the plates and for such peripheral portions of the material to lie in close contact a little beyond the peripheral edges of the plates while yet permitting the required flow round such edges.

In any case the impervious walls or plates employed in apparatus according to the invention may be formed to provide the required channels by making the plates of corrugated form so that the corrugations constitute the channels.

In most cases the absorbent material and the walls between which it lies will be enclosed within a closely surrounding casing and in one such construction employing a series of spaced parallel plates with interposed pieces of absorbent material as above described the plates and the material will be clamped together to form a unit, as by means of bolts or otherwise, and inserted into a casing with the peripheral wall of which the peripheral portions of the absorbent material makes close contact while inlet and outlet passages communicate with the ends of the casing.

In any case apparatus according to the invention may be provided with means for admitting additional air or gas to the carburetted mixture chamber or passage and for controlling such admission for the purpose of permitting and controlling dilution of the mixture with air or gas.

The invention may be carried into practice in various ways but the following description by way of example of one convenient construction according to the invention suitable for use as the combined fuel storage and carburetting apparatus of a small internal combustion engine, for example a fractional horse-power engine developing say one sixteenth horse-power, is made with reference to the accompanying drawings in which:

Figure 1 is a sectional view of the apparatus, and

Figure 2 is a perspective view of one of the corrugated plates used in the construction.

The apparatus comprises a cylindrical casing 1 one end of which is closed by a readily removable lid 2 formed with a central air inlet passage 3, while the other end is formed with an end wall 4 with a carburetted mixture outlet aperture 5. An outlet duct 6 which is secured to the end wall 4 has a main throttle valve 7 for control purposes and is provided with an extra air inlet 8 for dilution purposes. The air inlet 8 is controlled by an air control throttle valve 9, which may be automatically operated by an adjustable spring element for example, or otherwise, and leads into the outlet duct 6 at a point between the mixture outlet aperture 5 and the main throttle valve 7.

Arranged within the casing 1 is a combined fuel storage and carburetting unit comprising a series of circular radially corrugated plates 10 which may be formed of metal, some suitable plastic material or of other sheet material substantially impervious to and not open to attack by liquid fuel, these plates being arranged parallel to and coaxial with one another with circular pads 11 of fibrous absorbent material such as hard felt interposed between them. The stack of alternate plates 10 and pads of fibrous material 11 thus formed is united and held together by clamping bolts 12, for example three in number, passing through tight-fitting longitudinal holes 13 provided in the plates and pads, and angularly spaced around the axis of the assembly.

The pieces of felt 11, which are preferably comparatively thick, have central apertures therein, these apertures thus providing free passages 14 extending between the adjacent faces of the central portions of the plates 10 while the outer circumferential portions of the pieces of felt 11 extend beyond the circumferences of the plates 10 and lie in contact with one another but with a small circumferential gap 15 extending around the edge of each plate due to the fact that the plates hold adjacent pieces of felt apart for a short distance beyond the circumferential edges of the plates. The circumferential surfaces of the pieces of felt 11 lie in close contact with the cylindrical wall of the casing 1.

It will be understood that the end elements in the pack of alternate plates 10 and pieces of felt 11 thus formed will be plates 16 and 17 so that, if the unit is not spaced from each of the end walls of the casing by other means, such as the heads of the clamping bolts 12 or the nuts thereon, these end plates 16 and 17 will nevertheless act in effect as distance pieces permitting free flow of air or gas through the corrugations in their outer faces between the inlet and outlet passages 3 and 6 and the circumferential portions of such end plates.

With the above arrangement it will be seen that, when the apparatus is in use air will enter through the air inlet passage 3, will flow outwards to the edge of the adjacent end plate 16, in through the channels formed between the inner face of such end plate and the first piece of absorbent material 11 into the central aperture 14 in that piece of absorbent material, will traverse that central aperture in which the various air streams will be intermixed, will then be dispersed to flow outwards through the channels formed by the corrugations in the adjacent face of the next plate 10, around the edge of such next plate, in through the channels in the other face of such plate into the central aperture 14 in the next piece of absorbent material 11 where the air streams will again be intermixed and so on through the whole unit until it flows out through the channels formed by the corrugations in the end plate 17 at the outlet end of the casing 1, whence it will flow through the outlet passage 6 and to the engine either with or without air dilution. It will be appreciated also that as the air travels through the various groups of channels formed by the corrugations in the plates 10, it will become mixed with vapour from liquid fuel held by capillary attraction within the body of absorbent material formed by the pieces of absorbent material 11.

In this construction, therefore, whatever the attitude of the apparatus, and even if some part of the liquid fuel should drain by gravity into the lower part of the absorbent material, owing to the fact that the air streams are repeatedly intermixed the carburetting function of the apparatus is maintained.

It will be seen also that the apparatus inherently functions as an air cleaner, and to some extent as a silencer for the engine to which it is attached.

The combined liquid fuel reservoir and carburetting apparatus thus formed may be replenished with fuel in any convenient manner, as for example by removing the lid 2 and withdrawing the unit constituted by the plates 10 and pieces of absorbent material 11 and dipping it into fuel and replacing it or, where the position of the apparatus is apropriate with the air inlet 3 directed vertically downwards, by enveloping the casing 1 in a vessel containing liquid fuel inserted over its lower end without removing the unit from the container.

In any case care should be taken to ensure that the openings 14 in the pieces of absorbent material will not be filled with liquid fuel when the apparatus is brought into use, as by permitting surplus fuel to drain from the apparatus after it has been replenished or replenishing it with a predetermined appropriate quantity of fuel only.

What I claim as my invention and desire to secure by Letters Patent is:

1. Combined liquid storage and carburetting apparatus comprising a series of relatively impervious plates lying in spaced substantially parallel relationship and each formed to provide in each of its faces a group of channels each extending from a point adjacent to its center to a point adjacent to its periphery, a series of pieces of liquid-absorbent felt-like material interposed between said plates and together constituting a liquid storage reservoir retaining liquid by capillary attraction and of such nature as not to obstruct said channels in the plates, said pieces of liquid-absorbent felt-like material being formed with central apertures which constitute passages for the free flow of gas from the channels of one plate to the channels on the adjacent face of the adjacent plate, the arrangement being such as to permit flow of gas around the peripheral edges of the plates from the outer ends of the channels in one face thereof into the outer ends of the channels in the reverse face, and means for admitting gas to the channels in one end plate, and for withdrawing carburetted mixture from the channels in the opposite end plate.

2. Combined liquid storage and carburetting apparatus as claimed in claim 1, in which said pieces of liquid-absorbent material have peripheral portions extending beyond the peripheral edges of said plates, and said peripheral portions of the pieces of absorbent material lie in close contact with the peripheral portions of adjacent pieces just beyond the peripheral edges of the plates, while yet permitting the required flow around the edges of said plates.

3. Combined liquid storage and carburetting apparatus as claimed in claim 2, in which said plates are formed with radial corrugations.

4. Combined liquid storage and carburetting apparatus comprising a series of substantially impervious spaced plates each radially corrugated to provide a group of radial channels in each of its faces, each channel extending from a point adjacent the center of the plate to the periphery thereof, pieces of liquid-absorbent material of a hard felt-like character interposed between and extending beyond the edges of said plates, each piece of liquid-absorbent material being provided with a central aperture while the peripheral edge of each of said pieces makes close contact with the adjacent pieces of absorbent material while permitting free passage of gas through said channels in said plates and around the edges of said plates, means for clamping said plates and said interposed pieces of absorbent material together into a unitary assembly in which the body of said absorbent material constitutes a liquid reservoir retaining liquid by capillary attraction, a casing in which said unitary assembly lies with its peripheral surface in contact with the wall of said casing, and means for admitting air to one end of the casing and for withdrawing carburetted mixture from the other end of the casing.

References Cited in the file of this patent

UNITED STATES PATENTS

| Number | Name | Date |
|---|---|---|
| 80,918 | Coons | Aug. 11, 1868 |
| 838,719 | Kelley | Dec. 18, 1906 |
| 1,075,598 | Myers | Oct. 14, 1913 |
| 1,634,022 | Dalton | June 24, 1927 |